United States Patent
Baratam et al.

(10) Patent No.: US 9,444,758 B2
(45) Date of Patent: *Sep. 13, 2016

(54) SELECTIVE UNDERFLOW PROTECTION IN A NETWORK SWITCH

(71) Applicant: International Business Machines Corporation, Armonk, NY (US)

(72) Inventors: Prakash B. Baratam, Bangalore (IN); Brian T. Vanderpool, Byron, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 298 days.

This patent is subject to a terminal disclaimer.

(21) Appl. No.: 14/187,854

(22) Filed: Feb. 24, 2014

(65) Prior Publication Data

US 2015/0229576 A1    Aug. 13, 2015

Related U.S. Application Data

(63) Continuation of application No. 14/177,923, filed on Feb. 11, 2014.

(51) Int. Cl.
*H04L 12/801* (2013.01)
*H04L 12/863* (2013.01)
*H04L 12/933* (2013.01)
*H04L 29/06* (2006.01)
*H04L 12/947* (2013.01)

(52) U.S. Cl.
CPC ......... *H04L 47/6215* (2013.01); *H04L 49/101* (2013.01); *H04L 49/251* (2013.01); *H04L 69/22* (2013.01)

(58) Field of Classification Search
CPC ... H04L 47/54; H04L 47/6215; H04L 69/22; H04L 49/25; H04L 43/0823; H04L 49/101
USPC .......... 370/413, 388, 231, 401, 236
See application file for complete search history.

(56) References Cited

U.S. PATENT DOCUMENTS

| | | | |
|---|---|---|---|
| 6,952,419 B1 | 10/2005 | Cassiday et al. | |
| 6,982,979 B2 | 1/2006 | Ofek et al. | |
| 7,016,971 B1 | 3/2006 | Recio et al. | |
| 8,755,396 B2 * | 6/2014 | Sindhu | H04L 47/10 370/235 |

(Continued)

OTHER PUBLICATIONS

Jafri et al., "Adaptive Flow Control for Robust Performance and Energy," Proc. of the 2010 43rd Annual IEEE/ACM Internationall Symposium on Microarchitecture, IEEE Computer Society, 2010.

(Continued)

*Primary Examiner* — Candal Elpenord
*Assistant Examiner* — Syed M Bokhari
(74) *Attorney, Agent, or Firm* — Patterson + Sheridan, LLP

(57) ABSTRACT

Techniques are disclosed to transmit packets by a network switch and according to a link protocol while reducing incidence of intra-packet transmission gaps unsupported by the link protocol. Whether a packet satisfies an underflow risk condition is determined by evaluating, for each of one or more cycles since receipt of one or more flits of the packet, a respective count of flits of the packet received by the network switch in the respective cycle. Only upon determining that the packet satisfies the underflow risk condition is selective underflow protection performed for the packet, including buffering an increased count of flits of the packet, prior to commencing transmission of the packet.

20 Claims, 6 Drawing Sheets

(56) References Cited

U.S. PATENT DOCUMENTS

| | | |
|---|---|---|
| 2003/0195983 A1 | 10/2003 | Krause |
| 2011/0026405 A1 | 2/2011 | Takagi et al. |
| 2011/0243147 A1* | 10/2011 | Paul ........................ H04L 45/60 370/401 |
| 2014/0355449 A1* | 12/2014 | Tokuoka ............. H04L 12/5696 370/236 |
| 2015/0180780 A1* | 6/2015 | Froese .................... H04L 47/11 370/231 |

OTHER PUBLICATIONS

Huang et al., "Floodgate: Application-Driven Flow Control in Network-on-Chip for Many-Core Architectures," NoCArc '11, Dec. 4, 2011, Porto Alegre, Brazil, ACM, 2011.

U.S. Appl. No. 14/177,923, entitled "Selective Underflow Protection in a Network Switch", filed Feb. 11, 2014.

Office Action mailed Oct. 20, 2015 in U.S. Appl. No. 14/177,923, entitled "Selective Underflow Protection in a Network Swtich".

\* cited by examiner

| 201 | Legend | |
|---|---|---|
| | A | # of flits arrived |
| | K | min. # of flits to transmit per super-cycle |

Transmission pattern for A ≥ K

200

| 202 | Cycle within super-cycle | 0 | 1 | 2 | 3 |
|---|---|---|---|---|---|
| 204 | Flits to transmit | 2 | 2 | 2 | 1 |

FIG. 2A

Transmission pattern for A < K

210

| 202 | Cycle within super-cycle | 0 | 1 | 2 | 3 |
|---|---|---|---|---|---|
| 206 | Flits to transmit | 0 | 0 | 2 | 1 |

Delayed start of transmission

FIG. 2B

Determination to start transmission

300

| 302 | Cycle within super-cycle | 0 | 1 | 2 | 3 |
|---|---|---|---|---|---|
| 304 | Start transmission? | $\frac{A}{8} \geq \frac{K}{8}$ | $\frac{A}{6} \geq \frac{K}{8}$ | $\frac{A}{4} \geq \frac{K}{8}$ | YES |

SELECTIVE UNDERFLOW PROTECTION IN A NETWORK SWITCH

CROSS-REFERENCE TO RELATED APPLICATIONS

This application is a continuation of co-pending U.S. patent application Ser. No. 14/177,923, filed Feb. 11, 2014. The aforementioned related patent application is herein incorporated by reference in its entirety.

BACKGROUND

1. Field

Embodiments disclosed herein relate to computer networking More specifically, embodiments disclosed herein relate to selective underflow protection in a network switch.

2. Description of the Related Art

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

SUMMARY

Embodiments disclosed herein provide a method to transmit packets by a network switch and according to a link protocol while reducing incidence of intra-packet transmission gaps unsupported by the link protocol. The method includes determining whether an incoming packet satisfies the underflow risk condition, by evaluating, for each of one or more cycles since receipt of one or more flow control digits (flits) of the incoming packet, a respective count of flits of the incoming packet received by the network switch in the respective cycle. The method also includes, upon determining that the incoming packet satisfies the underflow risk condition, providing selective underflow protection for the incoming packet by buffering at least an increased count of flits of the incoming packet, prior to commencing transmission of incoming second packet, in order to prevent a transmission gap from occurring due to a buffer underrun when subsequently transmitting the incoming packet.

Other embodiments provide a computer program product to transmit packets by a network switch and according to a link protocol while reducing incidence of intra-packet transmission gaps unsupported by the link protocol. The computer program product includes a computer-readable storage medium having program code embodied therewith, the program code executable by one or more computer processors to determine whether an incoming packet satisfies the underflow risk condition, by evaluating, for each of one or more cycles since receipt of one or more flits of the incoming packet, a respective count of flits of the incoming packet received by the network switch in the respective cycle. The program code is also executable to, upon determining that the incoming packet satisfies the underflow risk condition, provide selective underflow protection for the incoming packet by buffering at least an increased count of flits of the incoming packet, prior to commencing transmission of the incoming packet, in order to prevent a transmission gap from occurring due to a buffer underrun when subsequently transmitting the incoming packet.

Still other embodiments provide a network switch to transmit packets according to a link protocol while reducing incidence of intra-packet transmission gaps unsupported by the link protocol. The network switch includes one or more computer processors and a memory containing a program which, when executed by the one or more computer processors, is configured to perform an operation that includes determining whether an incoming packet satisfies the underflow risk condition, by evaluating, for each of one or more cycles since receipt of one or more flits of the incoming packet, a respective count of flits of the incoming packet received by the network switch in the respective cycle. The operation also includes, upon determining that the incoming packet satisfies the underflow risk condition, providing selective underflow protection for the incoming packet by buffering at least an increased count of flits of the incoming packet, prior to commencing transmission of the incoming packet, in order to prevent a transmission gap from occurring due to a buffer underrun when subsequently transmitting the incoming packet.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

FIGS. 2A-2B show tables depicting example transmission patterns based on a count of received flits and a minimum count of flits to transmit per super-cycle, according to one embodiment presented in this disclosure.

FIG. 3 shows a table depicting determinations of whether to commence transmission of a packet at each cycle within a given super-cycle, according to one embodiment presented in this disclosure.

DETAILED DESCRIPTION

Figure 1:
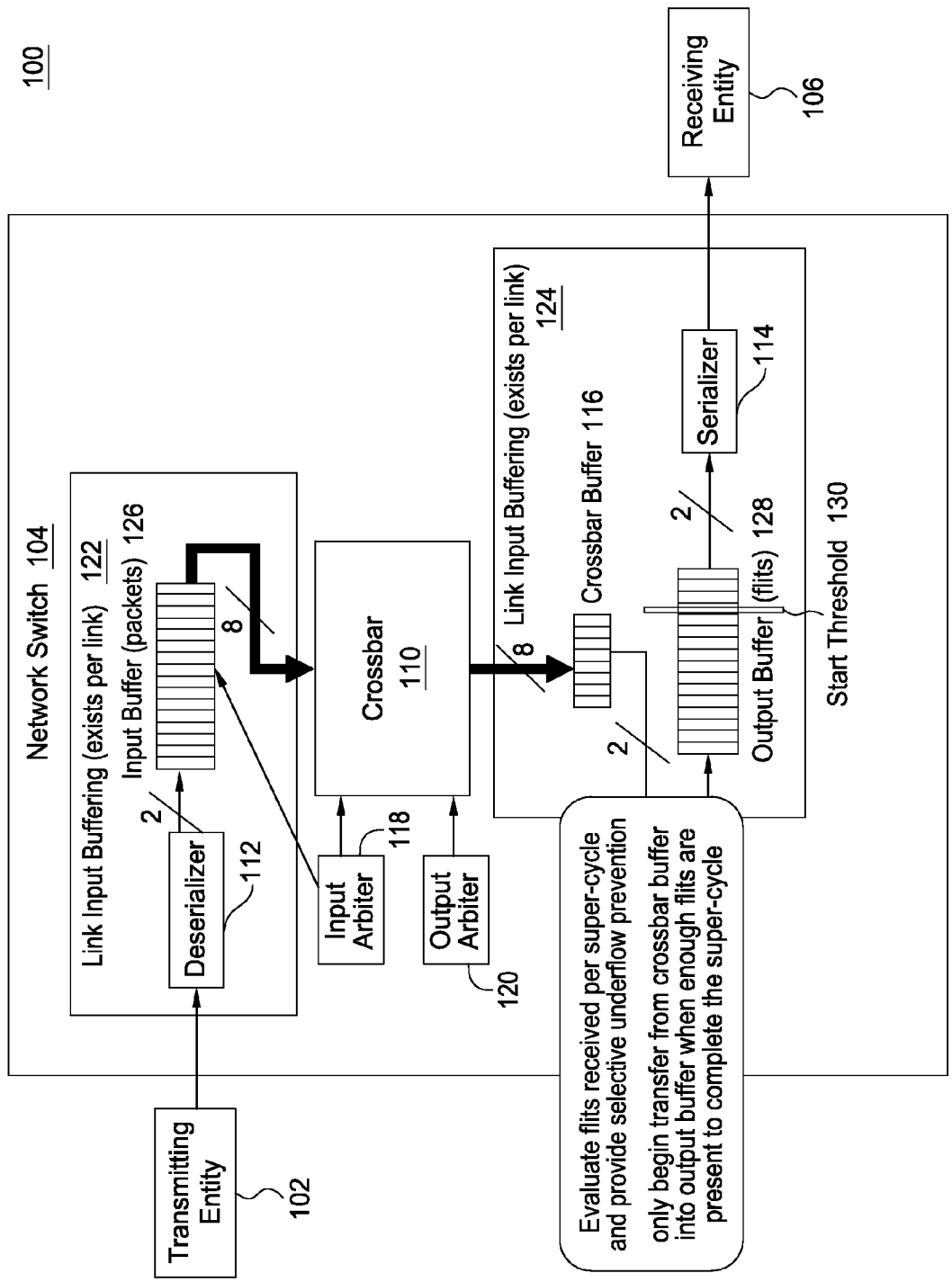
FIG. 1 is a schematic illustrating a network switch configured to provide selective underflow protection, according to one embodiment presented in this disclosure.

Embodiments disclosed herein generally provide techniques for a network switch to transmit packets according to a link protocol while reducing incidence of intra-packet transmission gaps prohibited by the link protocol.

At least in some embodiments, the switch may operate in a store-and-forward mode, which prohibits the switch from commencing transmission of a packet to a desired output link, until the entire packet is received by an input link of the switch. In order to support lower latency packet transmission at least relative to operating in the store-and-forward mode, switches may alternatively operate in a cut-through mode. This permits the switch to commence transmission of the packet to the desired output link of the switch, before the entire packet is received by the input link of the switch.

In some embodiments, each link is a high speed serial (HSS) link configured to operate at a first clock frequency, and an incoming data stream is clocked down from an HSS data interface of the switch to a second, lower clock frequency of internal logic of the switch. Data on the links may be grouped into units of flow control referred to as flow control units (flits). In some embodiments, a flit is the smallest unit of flow control according to a given flow control scheme. Because of the different clock frequencies between the links and the internal logic, the number of flits transferred per cycle may vary but may over time average out to the rate of the input link.

In some embodiments, to account for certain transmission phenomena such as jitter, drift between input and output link frequencies, or varied numbers of flits arriving per cycle, switches that support cut-through mode may buffer a configurable number of flits before beginning packet transmission on the output link, especially when the link protocol prohibits intra-packet transmission gaps, also referred to as idles within a packet. By buffering a configurable number of incoming flits before beginning transmission, the link sending logic may at least in some cases prevent an underrun from occurring.

At least in some embodiments, the switch may include a crossbar component, also referred to as a crossbar. Such switches may be referred to as crossbar switches. Crossbars serve as building blocks for on-chip interconnects and off-chip switching fabrics, such as those found in data centers. Crossbars having a high port count, also referred to as high-radix crossbars, are often desirable, because they allow larger networks to be created with fewer silicon chips and, hence, less cost. Despite technology scaling, crossbar port scaling is limited by the quadratic cost of crossbars as well as by the targeted port speed, which also increases from one silicon generation to the next. In this regard, even in cases where routing a large number of wires in a small area of silicon seems feasible on paper, placement-and-routing tools may still find it difficult to determine efficient wire routing given such constraints. Further, having a large number of input and/or output ports can increase the chip area required, which may necessitate pipelining data transfers across the chip.

Similarly, scalability of crossbar schedulers with the crossbar data-path may also be desired at least in some cases. Crossbar schedulers may provide arbitration between input and output arbiters of a crossbar. Further, crossbar schedulers include flat schedulers and hierarchical schedulers. Flat schedulers, having only one arbiter for each input port and output port, respectively, can often outperform hierarchical schedulers at least in terms of delay-throughput and fairness. However, routing the wires between M input and N output arbiters, where M and N are integers, requires a full-mesh interconnect having quadratic cost, which may be prohibitively expensive for crossbars with more than a given number of input and/or output ports, such as 64 ports.

To overcome this cost, hierarchical scheduling may be implemented, in which inputs are organized into groups, also referred to as quads, with arbitration being performed at a quad level rather than at a port level. Each input group or output group may also be associated with one or more input group arbiters or output group arbiters. Collectively, the arbiters control packet flow through the network switch.

In some embodiments involving a time-sliced switch having a crossbar component wider than the link width, data transfers through the crossbar component may be limited to fixed cycles, or no more than once per super-cycle. A super-cycle is a predefined number of cycles, e.g., four cycles, and a cycle within a super-cycle may also be referred to as a sub-cycle of the super-cycle. Doing so simplifies scheduling of the crossbar switch ports at least in some cases. In such a time-sliced switch, if the flit receipt rate, also referred to as the flit arrival rate, is near a minimum average arrival pattern, the flit output rate is near the maximum output rate, and the packet quickly wins arbitration, it is possible the first data transfer may not necessarily contain enough flits to fill the super-cycle and prevent a link sender underrun, which may trigger a fatal or non-fatal error, depending on the embodiment.

One approach is to increase the number of flits the link sender will buffer before beginning packet transmission, but doing so impacts the latency of every packet through the switch. Accordingly, at least some embodiments herein provide techniques for determining packets that satisfy an underflow risk condition and for delaying only such packets so determined. In a particular embodiment, a mechanism is provided to compare the number of flits transferred through a crossbar at the start of the packet, and delay serializing the flits out to the link until later in the super-cycle, in order to maintain the a minimum flit rate per super-cycle. Consequently, only the latency of the current packet is affected, and packets for which a sufficient number of flits are buffered before winning arbitration do not incur an additional start-of-packet delay.

FIG. 1 is a schematic 100 illustrating a network switch 104 configured to provide selective underflow protection, according to one embodiment presented in this disclosure. As shown, the network switch 104 includes deserializer 112, a serializer 114, and a crossbar 110 having an associated crossbar buffer 116, also referred to as buffer for short. At least in some embodiments, the deserializer 112 and the serializer 114 are separate components not part of any SerDes. In an alternative embodiment, however, the deserializer 112 and the serializer 114 form at least part of a SerDes of the network switch 104. The crossbar 110 communicably couples a set of input ports of the network switch 104 to a set of output ports of the network switch 104.

In one embodiment, the network switch 104 also includes an input arbiter 118 and an output arbiter 120. Further, the network switch 104 includes a link input buffering component 122 for each input link, and a link output buffering component 124 for each output link. As shown, the deserializer 112 is included in the link input buffering component 122, which further includes an input buffer 126 configured to store packets. Further, the serializer 114 is included in the link output buffering component 124, which further includes the crossbar buffer 116 and an output buffer 128 configured to store flits. As shown, each bus in the network switch 104 has an associated count characterizing a bus width measured in flits. In a particular embodiment, the input buffer 126 is configured to receive sixteen packets, where each packet includes eight to sixty flits. Arbitration between the input and output links is performed on a packet basis. The output buffer 128 is configured to track packets and looks at the count of received flits for the packet at the head of the queue. When the flit count of the packet exceeds a predefined start threshold 130, logic in the link output buffering component 124 and associated with the output buffer 128 begins sending flits of the packet to the serializer.

At least in some embodiments, the output buffer 128 can have a lower start-threshold, because the transfer from the crossbar buffer 116 may be delayed at the start of the super-cycle. The output buffer is programmed to begin transmission to the serializer when a predetermined number of flits are present. At least some embodiments delay the transfer from the crossbar buffer 116 into the output buffer 128 within a super-cycle, at least until underrun of the output buffer and—by extension, of the link—can be prevented. In one embodiment, the input and output arbiters 118 and 120 do not necessarily need to maintain a flit count. The selection underflow protection disclosed herein, also referred to as adaptive rate matching, is achieved between the crossbar buffer 116 and the output buffer 128.

In one embodiment, the network switch 104 receives a data stream including one or more incoming packets from a transmitting entity 102 and via a given input link, which incoming packets include flits and are deserialized by the deserializer 112 for the crossbar 110. The crossbar 110 then processes and forwards the incoming packets to be serialized by the serializer 114 to an output link en route to a receiving entity 106. The transmitting and receiving entities 102, 106 may each generally be any device operatively connected to the network switch, and as stated above, each link may be an HSS link in some embodiments.

According to at least some embodiments disclosed herein, the network switch 104 evaluates flits of the incoming packets received per cycle or super-cycle, against an underflow risk condition. Based on the evaluation, the network switch 104 provides selective underflow protection for sending the incoming packets. In a particular embodiment, transfer from the crossbar buffer into the output buffer only commences upon determining that a sufficient number of flits are present in order to complete the super-cycle. Doing so allows the network switch 104 to transmit packets according to a link protocol while at least in some cases reducing incidence of intra-packet transmission gaps unsupported by the link protocol.

In a particular embodiment, the network switch 104 receives one or more flits of an incoming packet. The destination of the packet is forwarded to an input arbiter 118, which is configured to communicate with an intended output arbiter 120 to establish a connection between the input and output links. In one embodiment, the connection is established when both the desired output link and a crossbar time slice are available. In a particular embodiment, the arbitration takes multiple cycles, and the input buffer 126 will have received enough flits, e.g., eight flits, to make the first transfer through the crossbar 110 completely fill the crossbar buffer 116, with no likelihood of underrun from the output buffer 116 to the serializer 114 and output link. However, if arbitration is completed quickly and prior to eight flits arriving, it is possible the first transfer through the crossbar may not necessarily contain a sufficient number flits to prevent an underrun in the first super-cycle. In this case, underflow prevention logic in the link output buffering component 124 is configured to delay the first flit transfer from the crossbar buffer 116 and intended for the output buffer 128. In this manner, the start threshold 130 of the output buffer does not have to be increased for all packets, at least when the logic begins packet transmission on the link.

To further illustrate disclosed embodiments, the following specific example is presented without limitation to the scope of disclosed embodiments. In a particular embodiment, a HSS link running at 25 Gb/s deserializes the incoming data stream into flits of F bytes and at 640 MHz, where F is five. The flits are then transferred to internal logic of the network switch, which runs at 450 MHz. This results in a nominal flit pattern of 1-1-2 at the 640/450 MHz boundary. Up to W flits are aggregated to form a wide word for transfer through a time-sliced crossbar in which one transfer per packet can occur per super-cycle, defined as C cycles, and in a particular embodiment, W is eight, and C is four. The fixed transfer cycle per packet greatly simplifies the scheduling of the crossbar at least in some cases. At the output of the crossbar, the eight flits are serialized out to the sending link, and at most M flits can be transferred per cycle, where M is two. The sending logic then transfers one or two flits per cycle to a HSS core for transmission on the HSS link. There may be a small delay of buffering, e.g., one cycle, before the link sending logic begins the packet transfer to the HSS core, in order to prevent underflow during the packet transmission.

In the event that a packet arrives during a comparatively low rate of flits, e.g., a five-flit super-cycle having flit pattern 1-1-2-1, and the packet wins arbitration within that super-cycle, but the output link is in a comparatively high flit rate of six-flit super-cycle having flit pattern 2-1-1-2, it is possible the outgoing packet will underrun. Rather than increasing the buffering for every packet, at least some embodiments disclosed herein effectively shift the start of packet transmission to the link sender by a calculated number of cycles to prevent underrun. In such embodiments, the network switch may include a programmable minimum number of flits to be transmitted within a super-cycle, also referred to herein as K. Depending on the particular implementation, K may be a fixed number of cycles or communicated by the HSS interface logic to for added adaptability. Accordingly, when the first crossbar transfer of a new packet arrives, the serializer compares the number of flits received/arrived, A, with K. If A≥K, then the serializer starts the packet transfer to the sending logic at the rate of two flits per cycle and until the flits of the current super-cycle are complete.

FIGS. 2A-2B show tables 200, 210 depicting example transmission patterns based on a count of received flits and a minimum count of flits to transmit per super-cycle, according to one embodiment presented in this disclosure. In addition to an accompanying legend 201, each table 200, 210 includes a cycle indicator 202 and a respective count 204, 206 of flits to transmit. Assume that each super-cycle includes four cycles labeled 0, 1, 2 and 3. Assume further that A=7 and K=5. The table 200 of FIG. 2A shows a transmission pattern for such a scenario of A≥K, which transmission pattern is given by 2-2-2-1 in this particular example. On the other hand, if A<K, then the network switch delays the start of this packet at least until the remaining flits can be transferred to keep up with the outgoing link rate without underflow. For instance, assume that A=3 and K=5. The table 210 of FIG. 2B shows a beginning transmission pattern for such a scenario of A<K, which transmission pattern is 0-0-2-1 in this particular example, and where 0-0 represents a delayed start of the transmission.

FIG. 3 shows a table 300 depicting determinations of whether to commence transmission of a packet at each cycle within a given super-cycle, according to one embodiment presented in this disclosure. The table 300 includes a cycle indicator 302 and a determination 304 of whether to commence transmission of a packet. In a particular embodiment, the network switch is configured to apply a set of underflow risk determination rules specifying that the ratio of K/W determines the starting point of each packet in a cycle C within a super-cycle: a packet can start if $A/(W-S*M) \geq K/W$ for cycles 0, 1, 2. Continuing the example of W=8 and M=2 as presented above, the rules specify that the ratio of K/8 determines the starting point of each packet in a cycle C within a super-cycle: a packet can start if $A/(8-S*2) \geq K/8$ for cycles 0, 1, 2. In some embodiments, the rules further specify that a packet is invariably permitted to start in cycle 3 to make room for a next incoming data transfer. On the other hand, in an alternative embodiment, a packet is permitted to start in cycle 3 only if $A/(8-S*2) \geq K/8$. In a particular embodiment, A, K, F, M, and W are integers that are configurable to suit the needs of a particular case. The set of underflow risk determination rules may similarly be configurable to suit the needs of a particular case.

Figure 4:
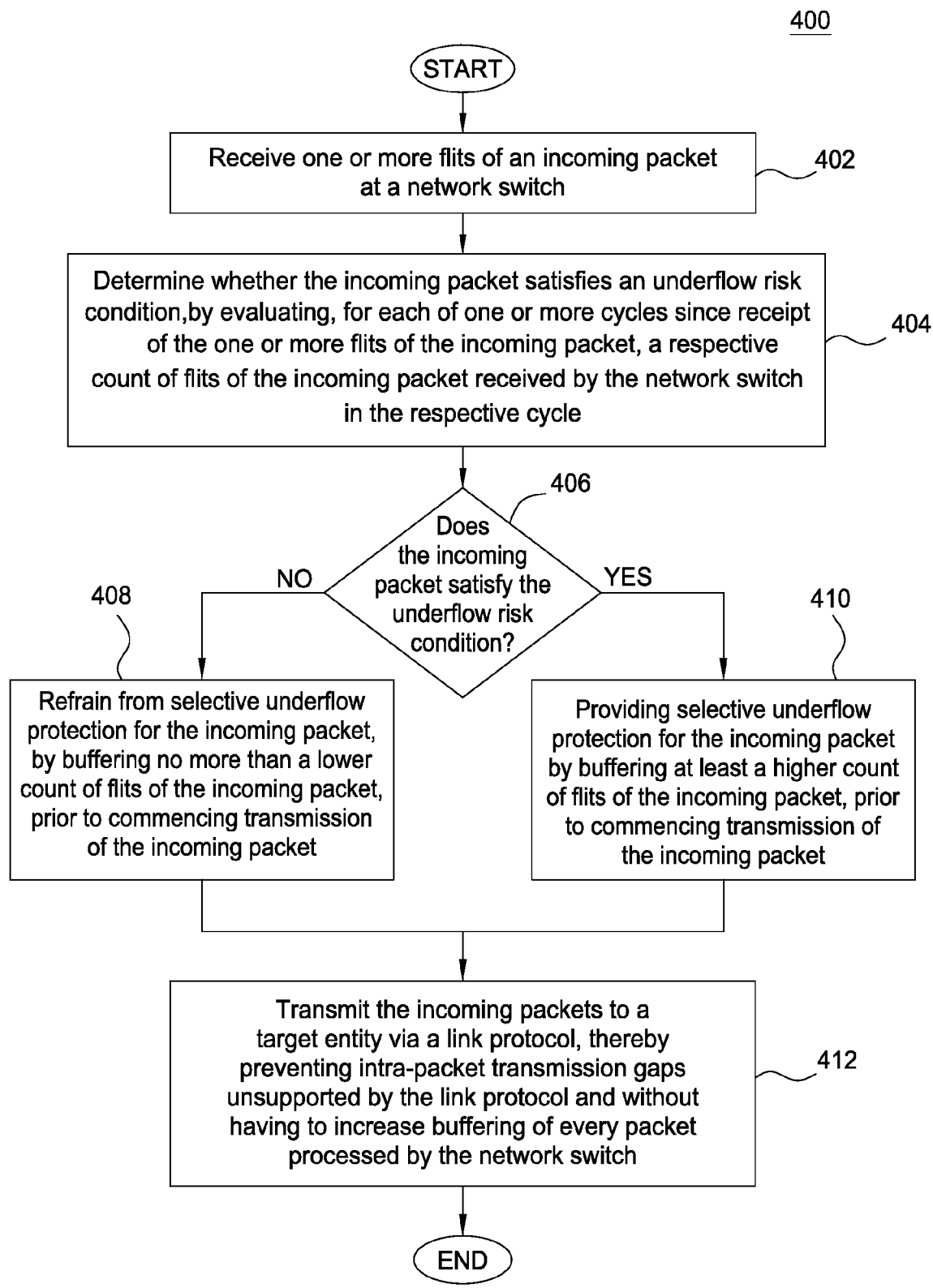
FIG. 4 is a flowchart illustrating a method for a network switch to transmit packets according to a link protocol while reducing incidence of intra-packet transmission gaps unsupported by the link protocol, according to one embodiment presented in this disclosure.

FIG. 4 is a flowchart illustrating a method 400 for a network switch to transmit packets according to a link protocol while reducing incidence of intra-packet transmission gaps unsupported by the link protocol, according to one embodiment presented in this disclosure. Depending on the embodiment, each individual step of the method 400 may be performed by any given component of the network switch 104 of FIG. 1. As shown, the method begins at step 402, where the network switch receives one or more flits of an incoming packet. At step 404, the network switch determines whether the incoming packet satisfies an underflow risk condition, by evaluating, for each of one or more cycles since receipt of one or more flits of the incoming packet, a respective count of flits of the incoming packet received by the network switch in the respective cycle.

At step 406, the network switch determines whether the incoming packet satisfies the underflow risk condition. If the underflow risk condition is not satisfied, then at step 408, the network switch refrains from selective underflow protection for the incoming packet, by buffering no more than a lower count of flits of the incoming packet, prior to commencing transmission of the incoming packet. On the other hand, if the underflow risk condition is satisfied, then at step 410, the network switch provides selective underflow protection for the incoming packet by buffering at least a higher count of flits of the incoming pack, prior to commencing transmission of the incoming packet.

After step 408 or 410, the method 400 proceeds to step 412, where the network switch transmits the incoming packet to a target entity via the link protocol, thereby preventing or at least reducing incidence of intra-packet transmission gaps unsupported by the link protocol and without having to increase buffering of every packet processed by the network switch. At least in some embodiments, transmission of the incoming packet to the target entity may commence prior to receiving the entirety of the first packet via the input link. Further, at least in some embodiments, each step of the method 400 is performed when the network switch is operating in cut-through mode. In some embodiments, the network switch constitutes at least part of a distributed, virtual switch.

Assume that the network switch receives a data stream that includes a first packet not satisfying the underflow risk condition, and a second packet satisfying the underflow risk condition. In such a scenario, the network switch refrains from selective underflow protection for the first packet while providing selective underflow protection for the second packet. Doing so prevents or at least reduces a likelihood of a transmission gap occurring due to a buffer underrun when subsequently transmitting the second packet. In an alternative embodiment, the first and second packets belong to different data streams.

At least in some embodiments, the network switch is a crossbar switch that includes a deserializer component, a crossbar component, and a serializer component. Depending on the embodiment, the deserializer and serializer components may be separate components or may together form a Serializer/Deserializer (SerDes) component of the network switch. In some embodiments, the crossbar switch is a time-sliced crossbar switch. Further, each of the first and second packets is received from a respective transmitting entity and by the crossbar switch via a respective input link of the crossbar switch. Further still, each of the first and second packets is transmitted from the crossbar switch to a respective receiving entity and via a respective output link of the crossbar switch. In some embodiments, each transmitting entity is the same transmitting entity, each receiving entity is the same receiving entity, each input link is the same input link, and each output link is the same output link.

As stated above, in some embodiments, the crossbar switch may be configured to support a plurality of modes of operation, e.g., a store-and-forward mode and a cut-through mode. When operating in the store-and-forward mode, the crossbar switch is prohibited from commencing transmission of a given packet via the output link, until the entirety of the given packet is received via the input link. In contrast, when operating in the cut-through mode, the crossbar switch is permitted to commence transmission of the second packet via the output link, even prior to receipt of the entirety of the second packet via the input link. As stated above, doing so allows the crossbar switch to support lower latency transmission at least relative to operating in the store-and-forward mode.

In one embodiment, the lower count of incoming flits is buffered in order to account for a plurality of transmission characteristics including jitter, drift between input and output link frequencies, and varied numbers of flits arriving per cycle. Doing so may at least in some cases reduce incidence of intra-packet transmission gaps unsupported by the link protocol. In addition, the higher count of incoming flits is buffered in order to further reduce incidence of intra-packet transmission gaps unsupported by the link protocol.

In one embodiment, each input link and each output link is a high speed serial (HSS) link configured to operate at a first clock frequency, and the crossbar component is configured to operate at a second clock frequency lower than the first clock frequency. In such embodiments, the data stream is clocked down from the first clock frequency of the input link to the lower clock frequency of the crossbar component and clocked up from the lower clock frequency of the crossbar component to the first clock frequency of the output link. As stated above, the count of flits transferred per cycle may vary due to the different clock frequencies but may average to the input link frequency rate over time.

In some embodiments, in order to facilitate port scheduling of the crossbar component, data transfer through the crossbar component is, limited to, in respective instances: (i) a fixed cycle and (ii) no more than once per super-cycle, where each super-cycle is four cycles. Further, satisfaction of the underflow risk condition by the second packet is determined based on satisfaction of each of multiple conditions including: (i) a current flit arrival rate to the crossbar component being within a predefined threshold of a minimum average arrival rate; (ii) a current flit output rate being near a maximum output rate; and (iii) the second packet winning arbitration in the crossbar component within a predetermined period of time measured in terms of at least one of clock cycles and seconds. As stated above, the arbitration is configured to allocate a set of resources of the crossbar component based on a predefined scheduling scheme, and the set of resources of the crossbar component includes a set of input ports of the crossbar component and a set of output ports of the crossbar component.

In one embodiment, the link protocol specifies a minimum flit rate per super-cycle, and the selective underflow protection delays serialization of one or more flits of the second packet until later in a given super-cycle and in order to maintain the specified minimum flit rate per super-cycle, despite the second packet satisfying the underflow risk condition, whereas serialization of one or more flits of the first packet is not delayed. Further, the buffer underrun may be characterized by a buffer of the crossbar component not containing enough flits to fill a given super-cycle of transmission. Further still, the network switch is configured to transmit at least a predefined minimum count of flits per super-cycle, equal to or higher than the minimum flit rate specified by the link protocol. The predefined minimum count is programmable and specified by link interface logic of the network switch.

In one embodiment, each count of flits of each packet is evaluated according to a predefined set of underflow risk determination rules specifying the compare the respective count of flits of the respective packet to the predefined minimum count of flits per super-cycle. At least in some embodiments, the increased count by which to buffer incoming flits of the second packet is determined based on the evaluation of flits of the second packet received by the network switch in each of the one or more cycles since receipt of the one or more flits of the second packet.

In one embodiment, the one or more cycles since receipt of the one or more flits of the first packet and of the second packet, respectively, include a respective plurality of consecutive cycles starting from the receipt of the one or more flits of the first and second packets, respectively. Further, in some embodiments, the crossbar component includes an input arbiter and an output arbiter, where the input arbiter is configured to provide arbitration among the input ports, and the output arbiter is configured to provide arbitration among the output ports. The network switch may itself be a component of a distributed, virtual switch, such as described below in conjunction with FIGS. 5-7.

Accordingly, a network switch configured according to the techniques disclosed herein can perform selective underflow protection based on an underflow risk condition. Doing so allows the network switch to transmit packets according to a link protocol and in a manner that, at least in some cases, reduces incidence of intra-packet transmission gaps prohibited by the link protocol.

Figure 5:
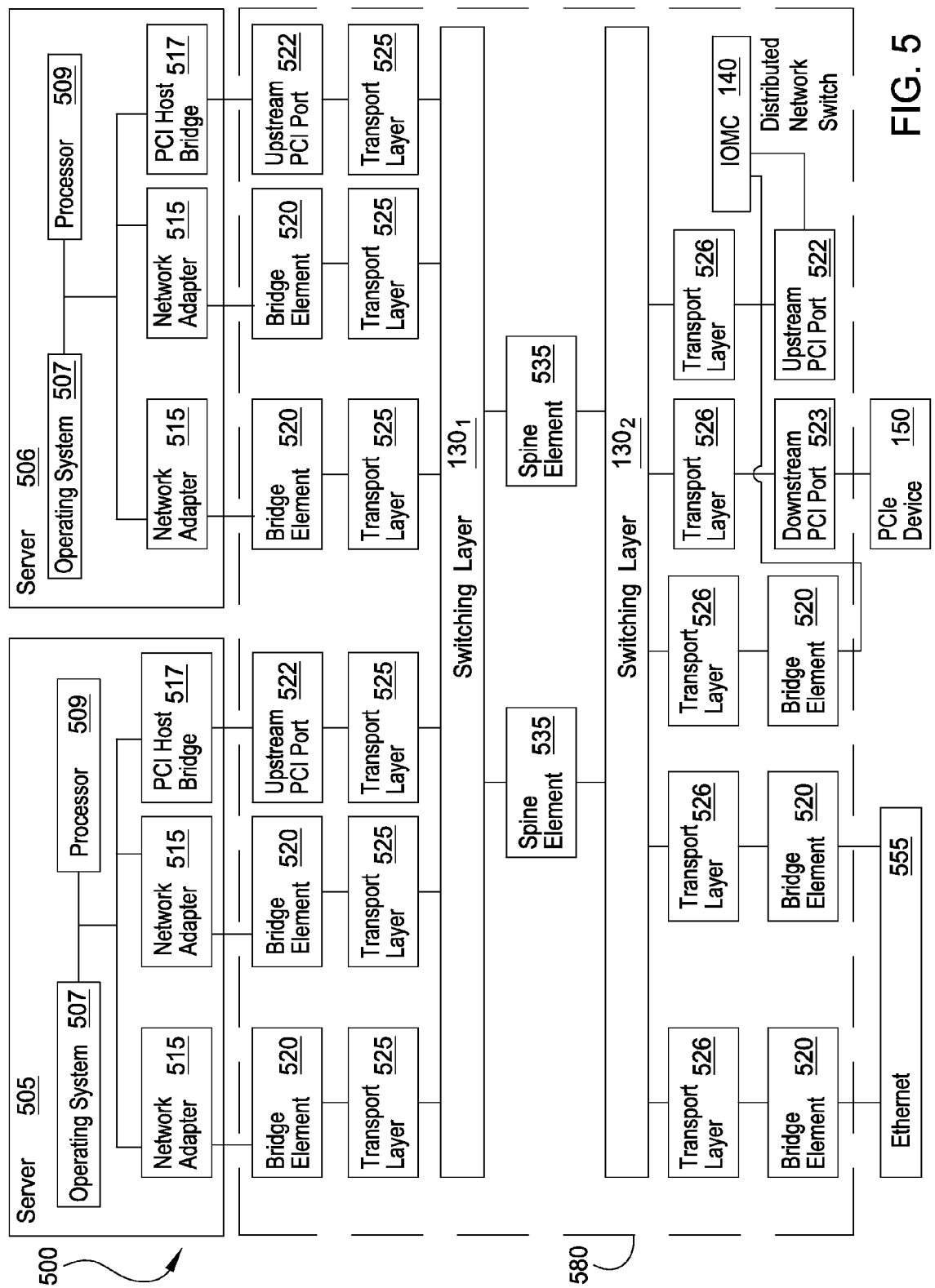
FIG. 5 illustrates a system architecture that includes a distributed, virtual switch, according to one embodiment presented in this disclosure.

FIG. 5 illustrates a system architecture 500 that includes a distributed, virtual switch, according to one embodiment presented in this disclosure. The first server 505 may include at least one processor 509 coupled to a memory (not pictured). The processor 509 may represent one or more processors (e.g., microprocessors) or multi-core processors. The memory may represent random access memory (RAM) devices comprising the main storage of the server 505, as well as supplemental levels of memory, e.g., cache memories, non-volatile or backup memories (e.g., programmable or flash memories), read-only memories, and the like. In addition, the memory may be considered to include memory storage physically located in the server 505 or on another computing device coupled to the server 505.

The server 505 may operate under the control of an operating system 507 and may execute various computer software applications, components, programs, objects, modules, and data structures, such as virtual machines (not pictured).

The server 505 may include network adapters 515 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 500 may include a multi-root I/O virtualization (MR-IOV) adapter. The network adapters 515 may further be used to implement of Fiber Channel over Ethernet (FCoE) protocol, RDMA over Ethernet, Internet small computer system interface (iSCSI), and the like. In general, a network adapter 515 transfers data using an Ethernet or PCI based communication method and may be coupled to one or more of the virtual machines. Additionally, the adapters may facilitate shared access between the virtual machines. While the adapters 515 are shown as being included within the server 505, in other embodiments, the adapters may be physically distinct devices that are separate from the server 505.

In one embodiment, each network adapter 515 may include a converged adapter virtual bridge (not shown) that facilitates data transfer between the adapters 515 by coordinating access to the virtual machines (not pictured). Each converged adapter virtual bridge may recognize data flowing within its domain (e.g., addressable space). A recognized domain address may be routed directly without transmitting the data outside of the domain of the particular converged adapter virtual bridge.

Each network adapter 515 may include one or more Ethernet ports that couple to one of the bridge elements 520. Additionally, to facilitate PCIe communication, the server may have a PCI Host Bridge 517. The PCI Host Bridge 517 would then connect to an upstream PCI port 522 on a switch element in the distributed switch 580. The data is then routed via a first switching layer $530_1$ to one or more spine elements 535. The spine elements 535 contain the hierarchical crossbar schedulers configured to perform arbitration operations. The data is then routed from the spine elements 535 via the second switching layer $530_2$ to the correct downstream PCI port 523 which may be located on the same or different switch module as the upstream PCI port 522. The data may then be forwarded to the PCI device 550. While the switching layers $530_{1-2}$ are depicted as separate, they logically represent different passes through the same switching layer 530, before and after being routed through one of the spine elements 535.

The bridge elements 520 may be configured to forward data frames throughout the distributed virtual switch 580. For example, a network adapter 515 and bridge element 520 may be connected using two 40 Gbit Ethernet connections or one 100 Gbit Ethernet connection. The bridge elements 520 forward the data frames received by the network adapter 515 to the first switching layer $530_1$, which is then routed through a spine element 535, and through the second switching layer $530_2$. The bridge elements 520 may include a lookup table that stores address data used to forward the received data frames. For example, the bridge elements 520 may compare address data associated with a received data frame to the address data stored within the lookup table. Thus, the network adapters 515 do not need to know the network topology of the distributed switch 580.

The distributed virtual switch 580, in general, includes a plurality of bridge elements 520 that may be located on a plurality of a separate, though interconnected, hardware components. To the perspective of the network adapters 515, the switch 580 acts like one single switch even though the switch 580 may be composed of multiple switches that are physically located on different components. Distributing the switch 580 provides redundancy in case of failure.

Each of the bridge elements 520 may be connected to one or more transport layer modules 525 that translate received data frames to the protocol used by the switching layers $530_{1-2}$. For example, the transport layer modules 525 may translate data received using either an Ethernet or PCI communication method to a generic data type (e.g., a cell) that is transmitted via the switching layers $530_{1-2}$ (e.g., a cell fabric). Thus, the switch modules comprising the switch 580 are compatible with at least two different communication protocols—e.g., the Ethernet and PCIe communication standards. That is, at least one switch module has the necessary logic to transfer different types of data on the same switching layers $530_{1-2}$. Further, at least one bridge element 520 may provide selective underflow protection according to the techniques disclosed herein.

Although not shown in FIG. 5, in one embodiment, the switching layers $530_{1-2}$ may comprise a local rack interconnect with dedicated connections which connect bridge elements 520 located within the same chassis and rack, as well as links for connecting to bridge elements 520 in other chassis and racks.

After the spine element 535 routes the cells, the switching layer $530_2$ may communicate with transport layer modules 526 that translate the cells back to data frames that correspond to their respective communication protocols. A portion of the bridge elements 520 may facilitate communication with an Ethernet network 555 which provides access to a LAN or WAN (e.g., the Internet). Moreover, PCI data may be routed to a downstream PCI port 523 that connects to a PCIe device 450. The PCIe device 550 may be a passive backplane interconnect, as an expansion card interface for add-in boards, or common storage that can be accessed by any of the servers connected to the switch 580.

Although "upstream" and "downstream" are used to describe the PCI ports, this is only used to illustrate one possible data flow. For example, the downstream PCI port 523 may in one embodiment transmit data from the connected to the PCIe device 550 to the upstream PCI port 522. Thus, the PCI ports 522, 523 may both transmit as well as receive data.

A second server 506 may include a processor 509 connected to an operating system 507 and memory (not pictured) which includes one or more virtual machines similar to those found in the first server 505. The memory of server 506 also includes a hypervisor (not pictured) with a virtual bridge (not pictured). The hypervisor manages data shared between different virtual machines. Specifically, the virtual bridge allows direct communication between connected virtual machines rather than requiring the virtual machines to use the bridge elements 520 or switching layers $530_{1-2}$ to transmit data to other virtual machines communicatively coupled to the hypervisor.

A special-purpose processor such as an Input/Output Management Controller (IOMC) 540 is coupled to at least one bridge element 520 or upstream PCI port 522 which provides the IOMC 540 with access to the second switching layer $530_2$. One function of the IOMC 540 may be to receive commands from an administrator to configure the different hardware elements of the distributed virtual switch 580. In one embodiment, these commands may be received from a separate switching network from the second switching layer $530_2$.

Although one IOMC 540 is shown, the system 500 may include a plurality of IOMCs 540. In one embodiment, these IOMCs 540 may be arranged in a hierarchy such that one IOMC 540 is chosen as a master while the others are delegated as members (or slaves).

Figure 6:
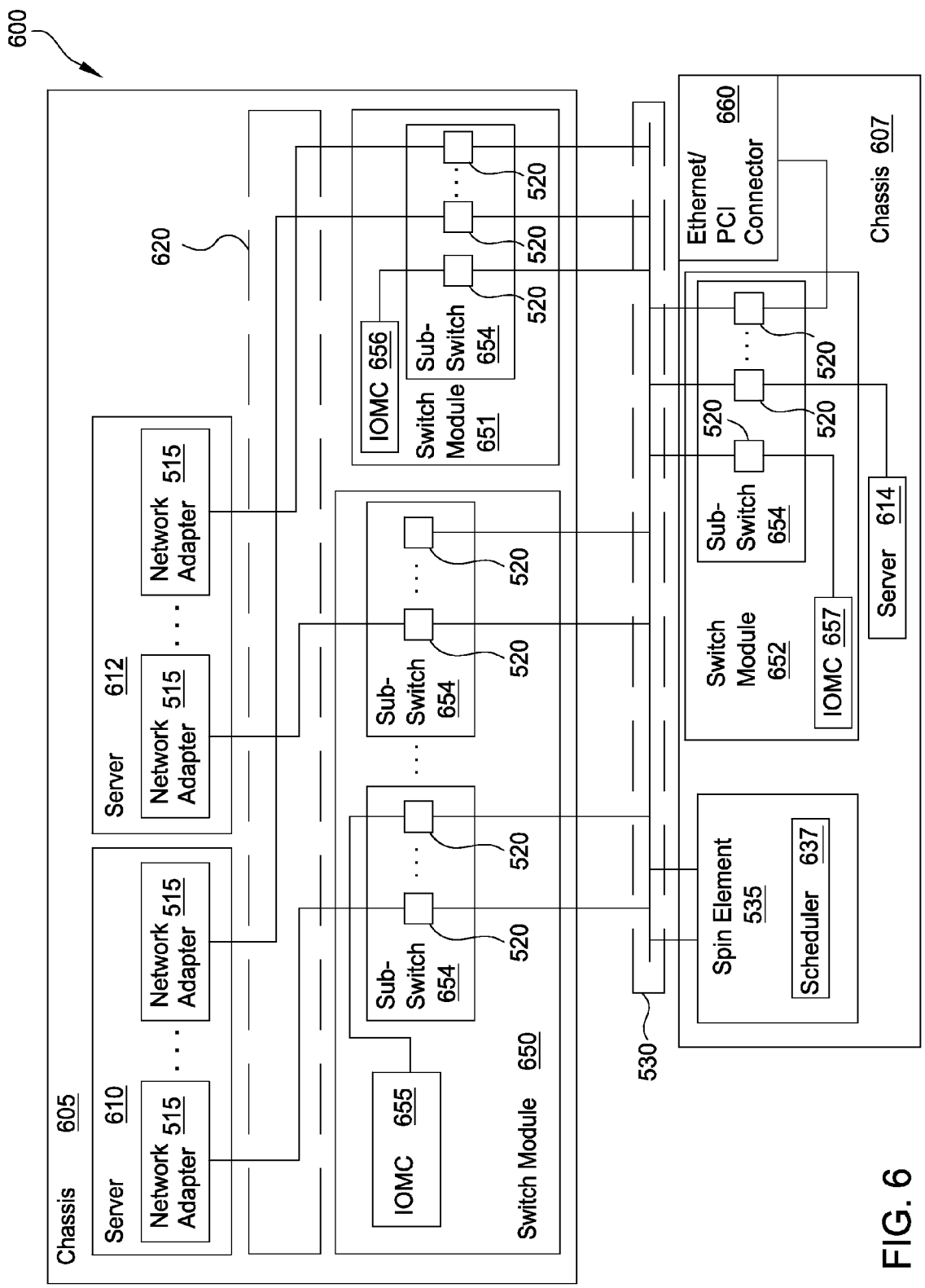
FIG. 6 illustrates a hardware representation of a system that implements a distributed, virtual switch, according to one embodiment presented in this disclosure.

FIG. 6 illustrates a hardware level diagram 600 of the system architecture 500, according to one embodiment presented in this disclosure. Server 610 and 612 may be physically located in the same chassis 605; however, the chassis 605 may include any number of servers. The chassis 605 also includes a plurality of switch modules 650, 651 that include one or more sub-switches 654 (e.g., a microchip). In one embodiment, the switch modules 650, 651, 652 are hardware components (e.g., PCB boards, FPGA boards, etc.) that provide physical support and connectivity between the network adapters 515 and the bridge elements 520. In general, the switch modules 650, 651, 652 include hardware that connects different chassis 605, 607 and servers 610, 612, 614 in the system 600 and may be a single, replaceable part in the computing system.

The switch modules 650, 651, 652 (e.g., a chassis interconnect element) include one or more sub-switches 654 and an IOMC 655, 656, 657. The sub-switches 654 may include a logical or physical grouping of bridge elements 520—e.g., each sub-switch 654 may have five bridge elements 520. Each bridge element 520 may be physically connected to the servers 610, 612. For example, a bridge element 520 may route data sent using either Ethernet or PCI communication protocols to other bridge elements 520 attached to the switching layer 530 using the routing layer. However, in one embodiment, the bridge element 520 may not be needed to provide connectivity from the network adapter 515 to the switching layer 530 for PCI or PCIe communications.

The spine element 535 allows for enhanced switching capabilities by connecting N number of sub-switches 654 using less than N connections, as described above. To facilitate the flow of traffic between the N switch elements, the spine element 535 has a crossbar scheduler 637 which perform the arbitration operations described above. Depending on the embodiment, the crossbar scheduler may be a hierarchical scheduler or a flat scheduler. The inputs ports coming from different sub-switches 654 are grouped into input quads or groups on the spine element 535. The input groups communicate to the crossbar scheduler 637 when one or more of their input ports have packets targeting an output port of the spine element 535, which are also grouped into quads. In some embodiments, the crossbar scheduler 637 provides port-level fairness by granting each input port in the input group an opportunity to send a packet before moving on to another input group.

Each switch module 650, 651, 652 includes an IOMC 655, 656, 657 for managing and configuring the different hardware resources in the system 600. In one embodiment, the respective IOMC for each switch module 650, 651, 652 may be responsible for configuring the hardware resources on the particular switch module. However, because the switch modules are interconnected using the switching layer 530, an IOMC on one switch module may manage hardware resources on a different switch module. As discussed above, the IOMCs 655, 656, 657 are attached to at least one sub-switch 654 (or bridge element 520) in each switch module 650, 651, 652 which enables each IOMC to route commands on the switching layer 530. For clarity, these connections for IOMCs 656 and 657 have been omitted.

Moreover, switch modules 651, 652 may include multiple sub-switches 654. Further, at least one switch module may provide selective underflow protection according to the techniques disclosed herein.

The dotted line in chassis 605 defines the midplane 620 between the servers 610, 612 and the switch modules 650, 651. That is, the midplane 620 includes the data paths (e.g., conductive wires or traces) that transmit data between the network adapters 515 and the sub-switches 654.

Each bridge element 520 connects to the switching layer 530 via the routing layer. In addition, a bridge element 520 may also connect to a network adapter 515 or an uplink. As used herein, an uplink port of a bridge element 520 provides a service that expands the connectivity or capabilities of the system 600. As shown in chassis 607, one bridge element 520 includes a connection to an Ethernet or PCI connector 660. For Ethernet communication, the connector 660 may provide the system 600 with access to a LAN or WAN (e.g., the Internet). Alternatively, the port connector 660 may connect the system to a PCIe expansion Slot—e.g., PCIe device 550. The device 550 may be additional storage or memory which each server 610, 612, 614 may access via the switching layer 530. Advantageously, the system 600 provides access to a switching layer 530 that has network devices that are compatible with at least two different communication methods.

As shown, a server 610, 612, 614 may have a plurality of network adapters 515. This provides redundancy if one of these adapters 515 fails. Additionally, each adapter 515 may be attached via the midplane 620 to a different switch module 650, 651, 652. As illustrated, one adapter of server 610 is communicatively coupled to a bridge element 520 located in switch module 650 while the other adapter is connected to a bridge element 520 in switch module 651. If one of the switch modules 650, 651 fails, the server 610 is still able to access the switching layer 530 via the other switching module. The failed switch module may then be replaced (e.g., hot-swapped) which causes the IOMCs 655, 656, 657 and bridge elements 520 to update the routing tables and lookup tables to include the hardware elements on the new switching module.

Figure 7:
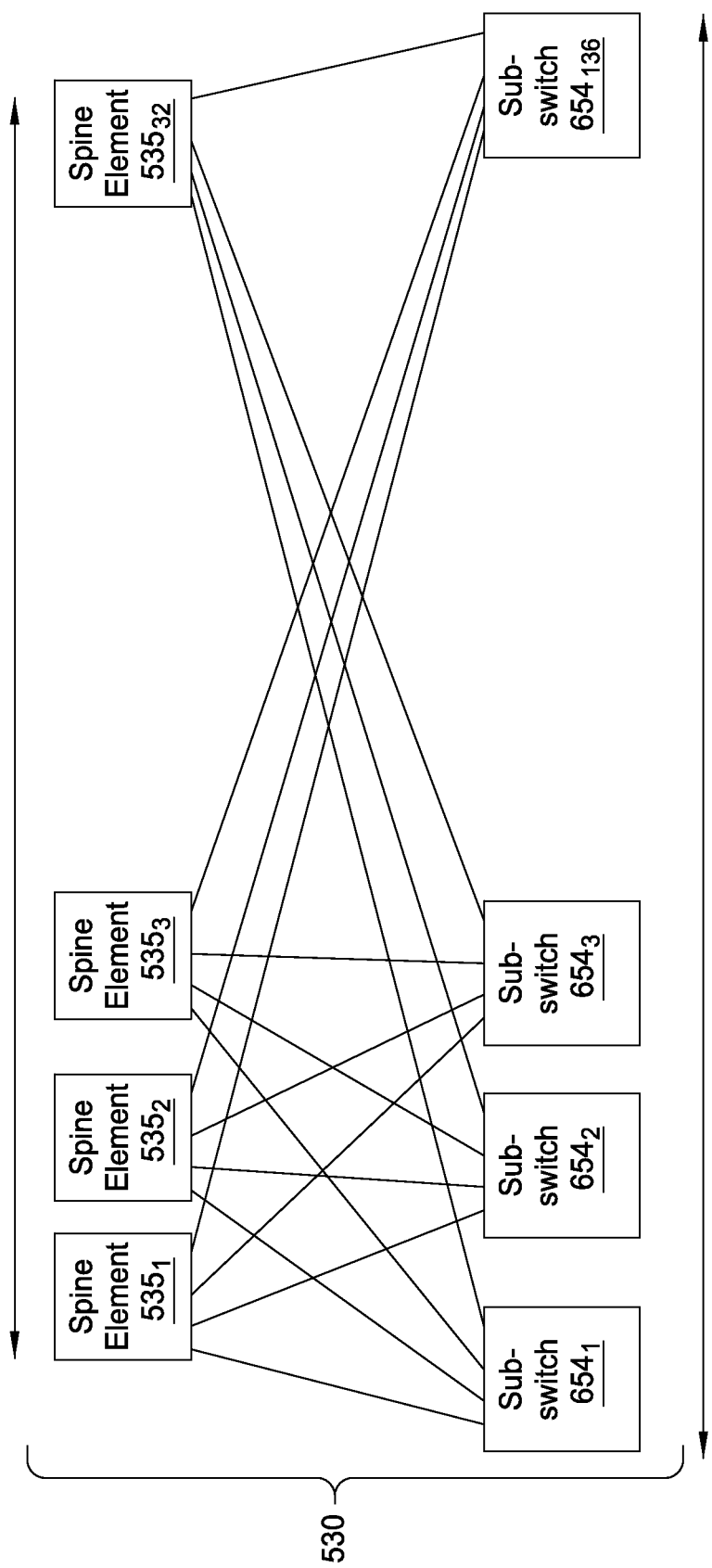
FIG. 7 illustrates a switching layer for a distributed, virtual switch, according to one embodiment presented in this disclosure.

FIG. 7 illustrates the virtual switching layer 530 of the hardware level diagram 600, according to one embodiment presented in this disclosure. As shown, the switching layer 530 may use a spine-leaf architecture where each sub-switch $654_{1-136}$ (i.e., a leaf node) is attached to at least one spine node $635_{1-32}$. The spine nodes $535_{1-32}$ route cells received from the sub-switch $654_N$ to the correct spine node which then forwards the data to the correct sub-switch $654_N$. That is, no matter the sub-switch $654_N$ used, a cell (i.e., data packet) can be routed to another other sub-switch $654_N$ located on any other switch module $654_{1-N}$. Although FIG. 7 is described in conjunction with the presence of one hundred and thirty-six sub-switches and thirty-two spine elements, embodiments disclosed herein are not limited to such a configuration, and other ranges are broadly contemplated.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method to reduce incidence of intra-packet transmission gaps unsupported by a link protocol used by a network switch in transmitting packets, the computer-implemented method comprising:
    determining whether each of a plurality of incoming packets satisfies the underflow risk condition, by evaluating, for each of one or more cycles since receipt of one or more flow control digits (flits) of the respective incoming packet, a count of flits of the respective incoming packet received by the network switch in the respective cycle;
    upon determining that a first of the plurality of incoming packets satisfies the underflow risk condition, providing selective underflow protection for the first incoming packet by buffering at least an increased count of flits of the first incoming packet, prior to commencing transmission of the first incoming packet and by operation of one or more computer processors;
    upon determining that a second of the plurality of incoming packets does not satisfy the underflow risk condition, refraining from selective underflow protection for the second incoming packet, by buffering no more than a reduced count, relative to the increased count, of flits of the second incoming packet, prior to commencing transmission of the second incoming packet; and
    transmitting the first and second incoming packets according to the link protocol, without any intra-packet transmission gaps unsupported by the link protocol, and without having to buffer more than the reduced count of flits for every one of the plurality of incoming packets.

2. The computer-implemented method of claim 1, wherein the first and second incoming packets are transmitted according to the link protocol, without any intra-packet transmission gaps resulting from any buffer underruns, wherein latency associated with buffering more than the reduced count of flits for every packet processed by the network switch is avoided, wherein the network switch comprises a crossbar switch, wherein each of the first and second incoming packets is received from a respective transmitting entity and by the crossbar switch via a respective input link of the crossbar switch, wherein each of the first and second incoming packets is transmitted from the crossbar switch to a respective receiving entity and via a respective output link of the crossbar switch.

3. The computer-implemented method of claim 2, wherein each transmitting entity is the same transmitting entity, wherein each receiving entity is the same receiving entity, wherein each input link is the same input link, wherein each output link is the same output link, wherein the crossbar switch is configured to support a plurality of modes of operation, the plurality of modes including a store-and-forward mode and a cut-through mode.

4. The computer-implemented method of claim 3, wherein the crossbar switch when operating in the store-and-forward mode is prohibited from commencing transmission of a given packet via the output link, until the entirety of the given packet is received via the input link;
    wherein the crossbar switch when operating in the cut-through mode is permitted to commence transmission of the second incoming packet via the output link, even prior to receipt of the entirety of the second incoming packet via the input link, and in order to support lower latency transmission relative to operating in the store-and-forward mode.

5. The computer-implemented method of claim 4, wherein the increased count of incoming flits is buffered in order to account for a plurality of transmission characteristics including jitter, drift between input and output link frequencies, and varied numbers of flits arriving per cycle, in order to reduce incidence of intra-packet transmission gaps unsupported by the link protocol, wherein the increased count of incoming flits is buffered in order to further reduce incidence of intra-packet transmission gaps unsupported by the link protocol.

6. The computer-implemented method of claim 5, further comprising:

commencing transmission of the first incoming packet to the receiving entity via the output link according to the link protocol and prior to receiving the entirety of the first incoming packet via from the transmitting entity via the input link; and commencing transmission of the second incoming packet to the receiving entity via the output link according to the link protocol and prior to receiving the entirety of the second incoming packet via from the transmitting entity via the input link.

7. The computer-implemented method of claim 6, of which each step is performed when the network switch is operating in the cut-through mode, wherein the network switch includes a deserializer component, a crossbar component, and a serializer component, wherein the network switch is configured to receive a data stream including the first and second incoming packets, wherein each input link and each output link comprises a high speed serial (HSS) link configured to operate at a first clock frequency, wherein the crossbar component is configured to operate at a second clock frequency lower than the first clock frequency.

8. The computer-implemented method of claim 7, wherein the data stream is clocked down from the first clock frequency of the input link to the lower clock frequency of the crossbar component and clocked up from the lower clock frequency of the crossbar component to the first clock frequency of the output link, wherein the count of flits transferred per cycle varies due to the different clock frequencies but averages to the input link frequency rate over time.

9. The computer-implemented method of claim 8, wherein the crossbar switch comprises a time-sliced crossbar switch, in which the crossbar component is wider than each link, wherein in order to facilitate port scheduling of the crossbar component, data transfer through the crossbar component is, limited to, in respective instances: (i) a fixed cycle and (ii) no more than once per super-cycle, wherein each super-cycle is four cycles.

10. The computer-implemented method of claim 9, wherein satisfaction of the underflow risk condition by the second incoming packet comprises satisfaction of each of a plurality of conditions including: (i) a current flit arrival rate to the crossbar component being within a predefined threshold of a minimum average arrival rate; (ii) a current flit output rate being near a maximum output rate; and (iii) the second incoming packet winning arbitration in the crossbar component within a predetermined period of time measured in terms of at least one of clock cycles and seconds, wherein the arbitration is configured to allocate a set of resources of the crossbar component based on a predefined scheduling scheme, wherein the set of resources of the crossbar component includes a set of input ports of the crossbar component and a set of output ports of the crossbar component.

11. The computer-implemented method of claim 10, wherein the link protocol specifies a minimum flit rate per super-cycle, wherein the selective underflow protection delays serialization of one or more flits of the second incoming packet until later in a given super-cycle and in order to maintain the specified minimum flit rate per super-cycle, despite the second incoming packet satisfying the underflow risk condition, wherein serialization of one or more flits of the first incoming packet is not delayed.

12. The computer-implemented method of claim 11, wherein the buffer underrun is characterized by a buffer of the crossbar component not containing enough flits to fill a given super-cycle of transmission, wherein the network switch is configured to transmit at least a predefined minimum count of flits per super-cycle, equal to or higher than the minimum flit rate specified by the link protocol, wherein the predefined minimum count is programmable and specified by link interface logic of the network switch.

13. The computer-implemented method of claim 12, wherein the selective underflow protection is provided based on the underflow risk condition, wherein each count of flits of each packet is evaluated according to a predefined set of underflow risk determination rules specifying to compare the respective count of flits of the respective packet to the predefined minimum count of flits per super-cycle, wherein the increased count by which to buffer incoming flits of the second incoming packet is determined based on the evaluation of flits of the second incoming packet received by the network switch in each of the one or more cycles since receipt of the one or more flits of the second incoming packet.

14. The computer-implemented method of claim 13, wherein the one or more cycles since receipt of the one or more flits of the first incoming packet and of the second incoming packet, respectively, comprise a respective plurality of consecutive cycles starting from the receipt of the one or more flits of the first and second incoming packets, respectively, wherein the crossbar component includes an input arbiter and an output arbiter, wherein the input arbiter is configured to provide arbitration among the input ports, wherein the output arbiter is configured to provide arbitration among the output ports, wherein the network switch constitutes at least part of a distributed, virtual switch.

15. The computer-implemented method of claim 1, wherein the network switch comprises a crossbar switch.

16. The computer-implemented method of claim 1, wherein the network switch is configured to support a plurality of modes of operation, the plurality of modes including a store-and-forward mode and a cut-through mode.

17. The computer-implemented method of claim 16, wherein the computer-implemented method is performed when the network switch is operating in the cut-through mode.

18. The computer-implemented method of claim 1, wherein the first and second incoming packets are transmitted according to the link protocol, without any intra-packet transmission gaps resulting from any buffer underruns.

19. The computer-implemented method of claim 1, wherein latency associated with buffering more than the reduced count of flits for every packet processed by the network switch is avoided.

20. The computer-implemented method of claim 1, wherein the network switch comprises a time-sliced crossbar switch.

* * * * *